(12) United States Patent
Fischer et al.

(10) Patent No.: US 7,116,021 B2
(45) Date of Patent: Oct. 3, 2006

(54) BRIDGE RECTIFIER FOR CHARGING SYSTEM ALTERNATOR

(75) Inventors: Michael Fischer, Casselberry, FL (US); An Huu Nguyen, Orlando, FL (US); Gary Morrissette, Groveland, FL (US)

(73) Assignee: Wetherill Associates, Inc., Royersford, PA (US)

( * ) Notice: Subject to any disclaimer, the term of this patent is extended or adjusted under 35 U.S.C. 154(b) by 267 days.

(21) Appl. No.: 10/737,539

(22) Filed: Dec. 16, 2003

(65) Prior Publication Data

US 2005/0127763 A1    Jun. 16, 2005

(51) Int. Cl.
*H02K 7/00* (2006.01)

(52) U.S. Cl. .................... 310/68 D; 363/141

(58) Field of Classification Search ........... 310/68 D, 310/71; 363/141, 144, 145
See application file for complete search history.

(56) References Cited

U.S. PATENT DOCUMENTS

| | | | |
|---|---|---|---|
| 3,739,210 A * | 6/1973 | Bahlinger et al. ......... 310/68 D |
| 4,321,664 A * | 3/1982 | Matthai ...................... 363/144 |
| 4,606,000 A | 8/1986 | Steele et al. ................ 363/145 |
| 4,866,365 A | 9/1989 | Offiler et al. .................. 322/8 |
| 5,068,589 A | 11/1991 | Offiler et al. .................. 322/7 |
| 5,258,673 A * | 11/1993 | Gotoh ....................... 310/68 D |
| 5,451,823 A | 9/1995 | Deverall et al. ........... 310/68 D |
| 5,473,208 A | 12/1995 | Stihi ......................... 310/68 D |
| 5,729,063 A * | 3/1998 | Adachi et al. ............. 310/68 D |
| 5,828,564 A * | 10/1998 | Mori et al. ................... 363/141 |
| 5,991,184 A | 11/1999 | Russell et al. .............. 363/145 |
| 6,476,509 B1 | 11/2002 | Chen et al. ................. 290/1 R |
| 6,476,527 B1 | 11/2002 | Ballard et al. ............ 310/68 D |
| 6,552,908 B1 | 4/2003 | DeNardis ..................... 361/709 |
| 6,657,336 B1 * | 12/2003 | Morikaku et al. ......... 310/68 D |
| 6,661,662 B1 | 12/2003 | DeNardis ..................... 361/709 |

* cited by examiner

*Primary Examiner*—Dang Le
(74) *Attorney, Agent, or Firm*—Allen, Dyer, Doppelt, Milbrath & Gilchrist, P.A.

(57) ABSTRACT

A charging system includes an alternator body, rotor coil and stator windings. A bridge rectifier is positioned within the alternator body and connected to the stator windings for rectifying the electrical output from the stator windings. The rectifier includes a positive and negative heat sinks each having a top surface and spaced from each other with cooling fins on an outer surface of each heat sink. A plurality of diodes are positioned at each top surface of positive and negative heat sinks. A terminal assembly interconnects respective pairs of positive and negative diodes. At least one pair of interconnected positive and negative diodes are positioned offset from each other at an angle to provide a maximum surface area for the cooling fins.

35 Claims, 9 Drawing Sheets

BRIDGE RECTIFIER FOR CHARGING SYSTEM ALTERNATOR

FIELD OF THE INVENTION

The present invention relates to the field of bridge rectifiers used in alternators, and more particularly, this invention relates to the field of bridge rectifiers having positive and negative heat sinks, cooling fins and diodes for rectifying current produced by an alternator stator coil.

BACKGROUND OF THE INVENTION

Charging system (CS) alternators are used in large numbers of vehicles and have numerical designations denoting the outside diameter in millimeters of the stator coil. For example, a CS-144 alternator has a stator outside diameter of about 144 millimeters. This CS number can be used to compare relative size and amperes output of different alternators. The CS-144 type alternator, for example, is typically a large case alternator that fits many large or heavy duty General Motors vehicles and Hummers. The CS-144 alternator can come in different output levels, for example, 190 amps and 210 amps. This alternator usually includes rotor windings forming a rotor coil and mounted on a rotor shaft, a stator coil, double sealed ball bearings, contoured rotor segments, an internal fan, long life brushes, high temperature insulation, and a high capacity and rugged bridge rectifier mounted adjacent a rear cover of the alternator body. A fan is mounted next to a pulley in the front section of the alternator and draws air through rear air vents in a rear cover and through front air vents for cooling the alternator components. An internal fan is typically mounted on a rotor shaft and also draws air through a slip ring and frame assembly to aid in cooling the rectifier bridge, any regulator device positioned in the alternator body and the rear bearing. The air is expelled through air vents at the "pulley" or front end.

Many of these types of alternators use a high capacity and rugged bridge rectifier having positive and negative heat sinks that are spaced adjacent to each other and forming a gap therebetween. Button diodes are soldered on respective sides of the heat sink facing each other. Insulating spaces having terminals of a terminal assembly and/or lead frame are positioned between the positive and negative heat sinks and interconnect the button diodes to complete the rectifier circuit.

Although the CS-144 alternators and their bridge rectifiers as described usually form a robust alternator, the button diodes sometimes fail when a shear force such as created by excessive vehicle or other vibration, is applied to any solder joint securing the button diodes to the sides of the heat sink. Even without any added shear force applied to a solder joint, the joint could fail because of excess heat.

Some prior bridge rectifiers for CS-144 and similar alternators have used press fitted diodes in their designs, but the configuration of the cooling fins on the heat sinks, the location of the press fitted diodes relative to the overall configuration of the heat sinks, or the generally small configuration of the cooling fins have not been advantageous. Overheating has sometimes occurred because of inadequate heat sink cooling.

SUMMARY OF THE INVENTION

It is therefore an object of the present invention to provide a charging system alternator that overcomes the disadvantages of prior art alternators as described above.

It is yet another object of the present invention to provide a charging system alternator for a CS-144 or similar alternator that incorporates a bridge rectifier that can withstand heat, provide adequate cooling, and have extended diode life.

In accordance with the present invention, a charging system alternator includes an alternator body and a rotor coil mounted for rotation within the alternator body. Stator windings are supported in the housing and produce an electrical output as the rotor coil is rotated. A bridge rectifier is positioned within the alternator body and has an input connected to the stator winding for receiving and rectifying the electrical output from the stator windings.

A positive heat sink and negative heat sink are spaced from each other and form a gap therebetween. Each heat sink includes a side configured to face an opposing side of the other respective heat sink. An opposite cooling side of each heat sink includes cooling fins. A plurality of diodes are positioned at each positive and negative heat sink. A terminal assembly interconnects respective pairs of negative and positive diodes. At least one pair of interconnected negative and positive diodes are positioned offset from each other at an angle to provide a maximum surface area for the cooling fins.

In one aspect of the present invention, the diodes comprise press fitted diodes. In yet another aspect of the present invention, depressions can be formed within the positive and negative heat sinks at their top surface in which the diodes are received. These depressions can be plated. Also, metallic slugs can be received within the positive and negative heat sinks and each receive a respective positive or negative diode.

In one aspect of the present invention, the stator windings have an outside diameter of about 144 millimeters, corresponding to a CS-144 series alternator. The positive and negative heat sinks can be formed from an extruded metal material, such as aluminum. The alternator body typically includes a rear cover having air vents to allow maximum air flow through the cooling fins. The diodes typically include terminals, engaged by the terminal assembly. A lead frame can be positioned on a side opposite the terminal assembly and fasteners extend between the heat sinks and connect the terminal assembly and lead frame to each other.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention advantageously provides a bridge rectifier for use in a charging system alternator such as a high capacity and robust CS-144 alternator used for heavy duty applications. The alternator includes an alternator body, a rotor coil mounted for rotation within the alternator body and stator windings supported in the housing for producing an electrical output as the rotor coil is rotated. In accordance with the present invention, the bridge rectifier is designed with inserted or press fitted diodes at the top surface of the heat sinks. No button diodes are soldered on the heat sink sides. At least one pair of negative and positive diodes are positioned offset to each to provide a maximum surface area for the cooling fins. The bridge rectifier is positioned within the alternator and has an input connected to the stator windings for receiving and rectifying an electrical output from the stator windings.

This improved bridge rectifier of the present invention includes a positive heat sink and a negative heat sink spaced from each other and forming a gap therebetween. Each heat sink includes a side configured to face each other. An opposing cooling side includes cooling fins. A plurality of diodes are positioned at each positive and negative heat sink on a top surface and are preferably press fitted therein, but can be formed to be received in plated depressions on the top surface. A terminal assembly interconnects respective pairs of negative and positive diodes. At least one pair of interconnected negative and positive diodes are positioned offset from each other at an angle to provide a maximum surface area for the cooling fins.

Figure 1:
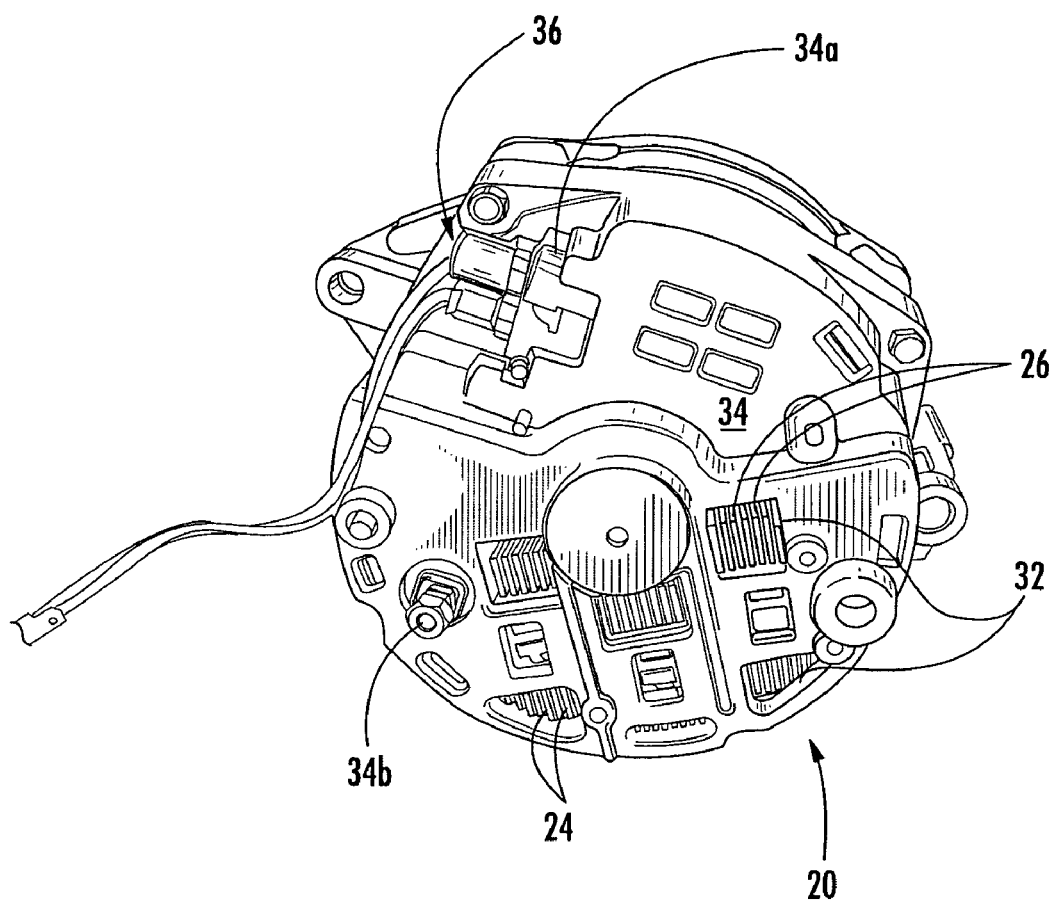
FIG. 1 is a perspective view looking toward the rear of a CS-144 alternator and showing air vents that expose the cooling fins of a prior art bridge rectifier positioned against the alternator rear housing.

FIG. 1 shows a CS-144 alternator 20 that includes a prior art bridge rectifier 22 (shown in FIGS. 2 and 3) positioned in the enclosure formed by the alternator 20 such that the cooling fins 24,26 on respective negative and positive heat sinks 28,30 are positioned adjacent air vents 32 in the rear cover 34 of an alternator body 36. For purposes of description, the CS-144 alternator 20 shown in FIG. 1 is first described followed by a description of the prior art bridge rectifiers shown in FIGS. 2–7, followed by a description of the bridge rectifier of the present invention shown in FIGS. 8–18. The rear cover 34 includes a terminal assembly 34a that connects to a wiring harness and typically a "bat" terminal 34b.

The alternator 20, for example, the illustrated CS-144 alternator produced by General Motors, includes the alternator body 36 (also known as a housing) that defines an alternator enclosure or interior space. The alternator body 36 or housing includes a front end or drive end body section and a rear end or slip ring body section having the rear cover 34. The drive end body section and rear cover include the air vents 32, allowing air flow into the alternator interior space and out the drive end body section. This alternator can be provided with any suitable air flow path for cooling the alternator, however.

The alternator interior space or enclosure includes a rotor coil mounted on a rotatable drive shaft. The drive end or front body section typically includes a bearing well that receives a drive end bearing for rotatably supporting one end of the drive shaft of the rotor coil. The rear body section having the rear cover typically includes a bearing well that receives a slip ring end bearing for rotatably supporting the other end of the drive shaft of the rotor coil.

The alternator body has a first side, a second side, a top end, a bottom end, a predetermined length, a predetermined width, and a predetermined height. The predetermined length of the alternator body 36 extends generally between an outermost portion of the drive end or front body section and an outermost portion of the bearing well of the slip ring or rear body section. The predetermined width of the alternator body 36 extends generally between the first side and the second side. The predetermined height of the alternator body extends generally between the top end and the bottom end.

In an installed position, the alternator 20 is disposed in a predetermined alternator space within a vehicle. This alternator space has a predetermined length, a predetermined width and a predetermined height, which typically corresponds to the length, width, and height, respectively, of the alternator.

A stator coil surrounds the rotor coil and is positioned in the magnetic field generated by the rotor coil. The stator coil is formed as a plurality of stator windings wound about a stator lamination, typically in a three-phase configuration.

The rotor coil is rotated by the vehicle engine via the drive shaft of the rotor coil so that a current is induced in the stator windings. The alternator generates Alternating Current (AC) electricity. The electricity induced in the stator windings is typically three-phase electricity, although in some instances, single phase electricity can be produced.

A voltage regulator is provided in the alternator interior space of the alternator body and is electrically connected to the rotor coil via slip rings provided on the drive shaft of the rotor coil for controlling the intensity of the magnetic field generated by the rotor coil. The voltage output of the alternator is typically maintained within predefined limits.

Figure 2:
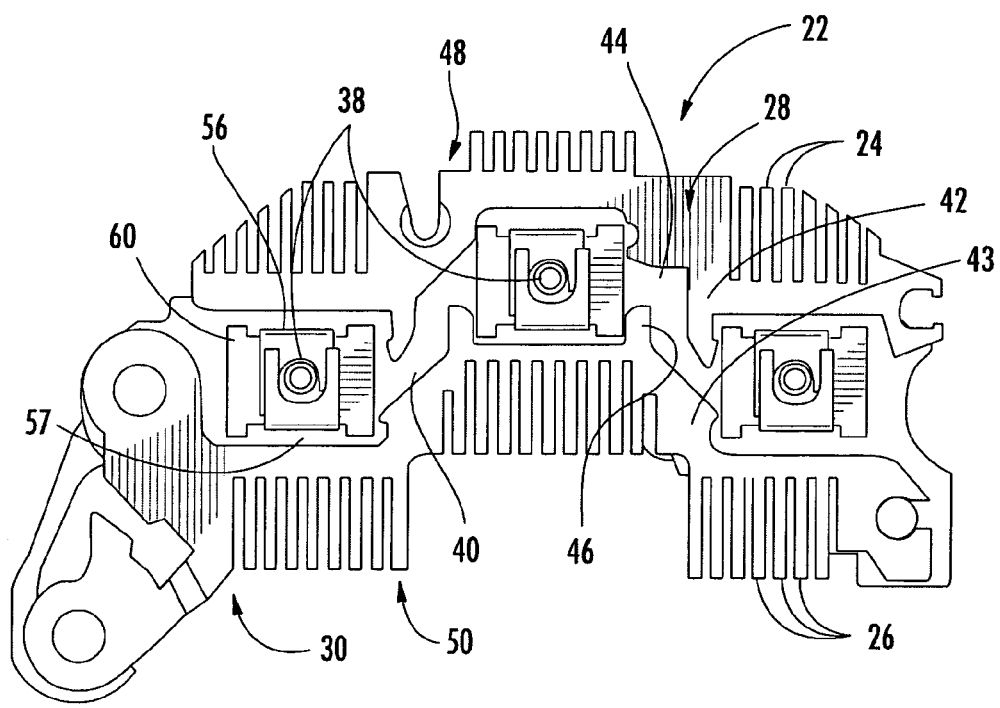
FIG. 2 is a top plan view of the prior art bridge rectifier shown positioned in the alternator of FIG. 1.
Figure 3:
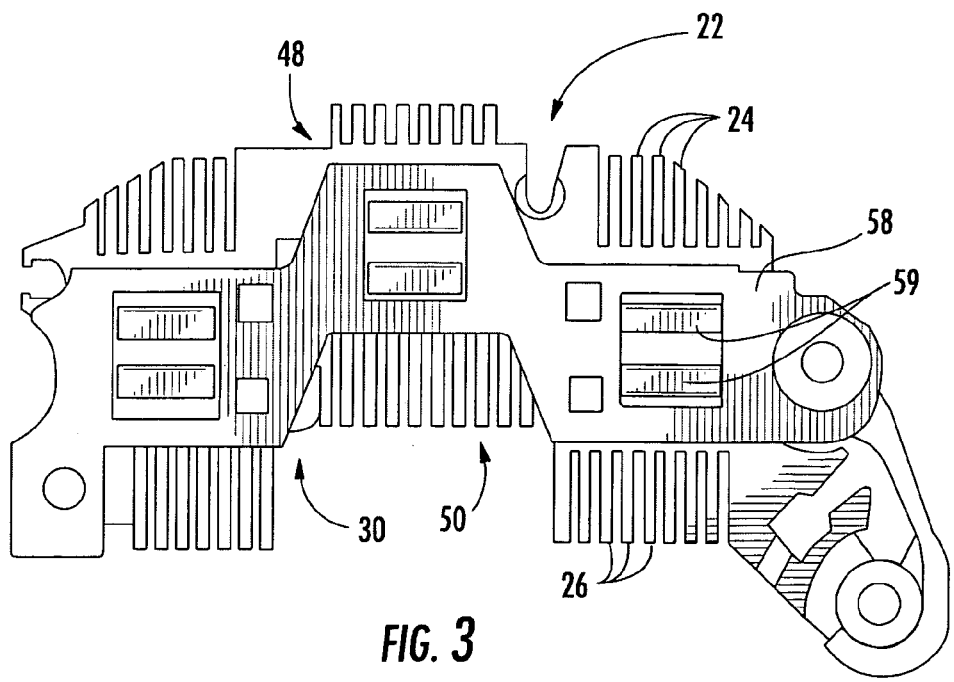
FIG. 3 is a bottom plan view of the prior art bridge rectifier shown in FIG. 2.

The AC output signal induced in the stator coil is supplied to the bridge rectifier 22 via output leads, typically three, which are either connected to or formed integrally with the stator windings and which are electrically connected to the bridge rectifier. Because of the close dimensions of the alternator enclosure or interior, the bridge rectifier has a certain configuration in CS-144 alternators, such as shown in FIGS. 2 and 3, a slight rectangular "U" shape with an extended leg portion. The bridge rectifier 22 shown in FIGS. 2 and 3 has three each of negative and positive diodes that are connected to terminals 38 positioned between negative and positive heat sinks 28,30. When the stator coil is provided in a three-phase configuration, three output leads are typically provided. It should be understood, however, that two output leads can be provided if the stator coil is configured as a single phase configuration. The bridge rectifier 22 rectifies the AC output signal induced in the stator coil to provide a DC output signal. Although the magnitude of the DC output signal can vary widely depending on the specifications of the alternator, the DC output signal typically has a voltage between about 12.5 Volts to about 15 volts for a 12 V charging system or between 36 V and 48 V for a 42 V charging system.

The DC output signal is transmitted to a DC output port provided on the alternator. As will be understood by those skilled in the art, the particular implementation of the DC output port will vary among different makes and models of alternators. For example, the DC output port can be "B+post" or any other suitable DC output port.

FIGS. 2 and 3 show respective top and bottom plan views of the prior art bridge rectifier 22 that is positioned within the CS-144 alternator 20 shown in FIG. 1. This prior art bridge rectifier 22 includes the negative and positive heat sinks 28,30 spaced from each other and forming a gap 40 therebetween. Each heat sink 28,30 has a top surface 42 and an inwardly positioned diode receiving side 44,46. Each heat sink 28,30 includes cooling side 48,50 opposite the other heat sink and having cooling fins 24,26 formed therein.

Button diodes 56,57 are soldered on the facing diode receiving sides 44,46. A lead frame 58 is positioned on the bottom surface of each heat sink and includes terminal connectors 59 that extend upward and connect the three illustrated screw terminals 38, which can be connected to wires or other connectors and securely locked by fasteners such as nuts. Insulated spacers 60 are located between the diode receiving sides of the negative and positive heat sinks. The spacers 60 support the terminal connectors 59 and terminals 38. This type of prior art bridge rectifier can be formed in a robust design when adequately designed button diodes are used. Shear forces, however, such as created by vehicle vibration, can weaken the solder joint of the button diodes and cause early diode failure. FIGS. 2 and 3 show that there is little room on the top surface for mounting the button diodes or any other type of diode, for example, a press fitted diode, which could better withstand some vibration.

Figure 4:
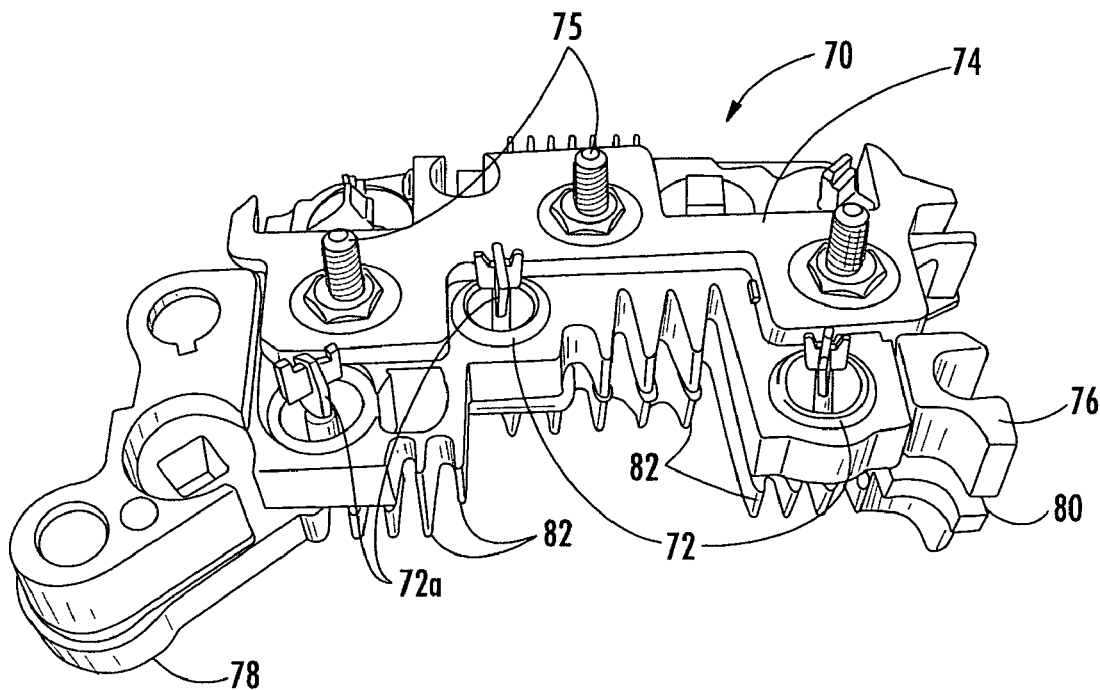
FIG. 4 is a proposed bridge rectifier for the alternator shown in FIG. 1, using press fitted diodes and positive and negative heat sinks stacked on each other.
Figure 5:
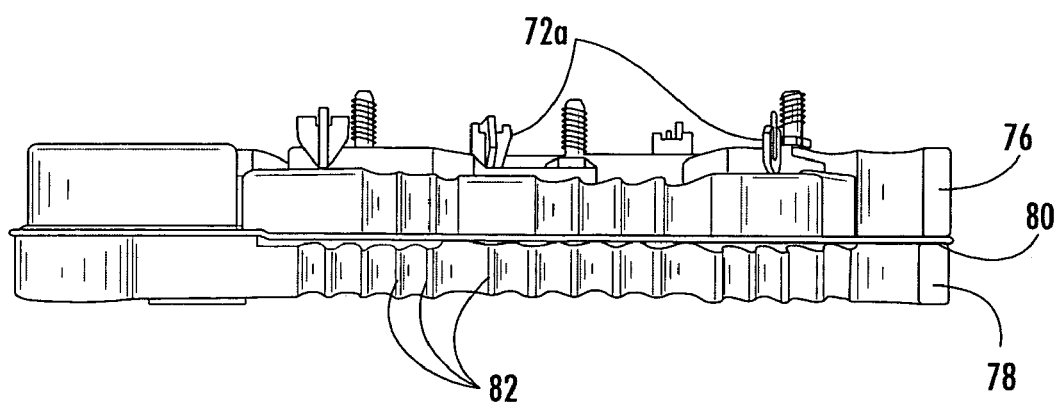
FIG. 5 is a front elevation view of the proposed bridge rectifier shown in FIG. 4.

FIGS. 4 and 5 show a perspective view (FIG. 4) and front elevation view (FIG. 5) of another proposed prior art bridge rectifier 70 similar to that shown in FIGS. 2 and 3, but instead this proposed bridge rectifier uses press fitted diodes 72 and a lead frame 74 that interconnects terminals 72a of the diodes and provides screw treaded bolt terminals 75. This prior art proposal is similar to other charging system bridge rectifiers such as used for CS-130 applications in which the bridge rectifier is formed from positive and negative heat sinks 76,78 that are stacked on top of each other and include an insulator gasket 80 therebetween. This proposal does not provide adequate cooling of the heat sinks because some cooling fins 82 located on the heat sinks are blocked by the overlapping heat sink as shown in FIG. 4.

Figure 6:
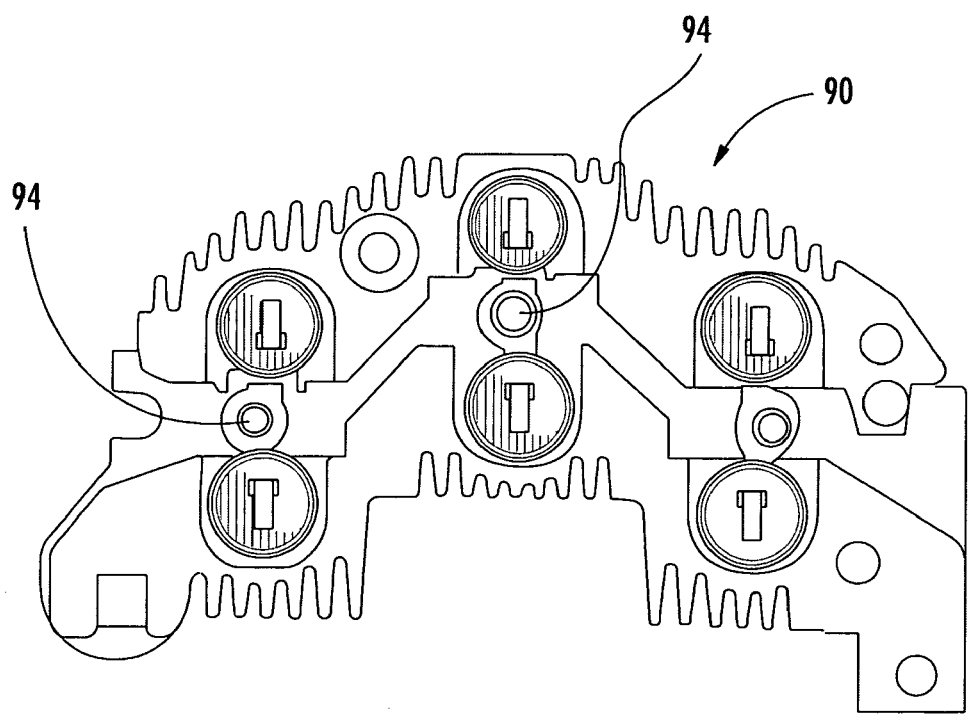
FIG. 6 is another proposed bridge rectifier similar to FIG. 4, and showing press fitted diodes, but adjacently positioned and not stacked heat sinks.
Figure 7:
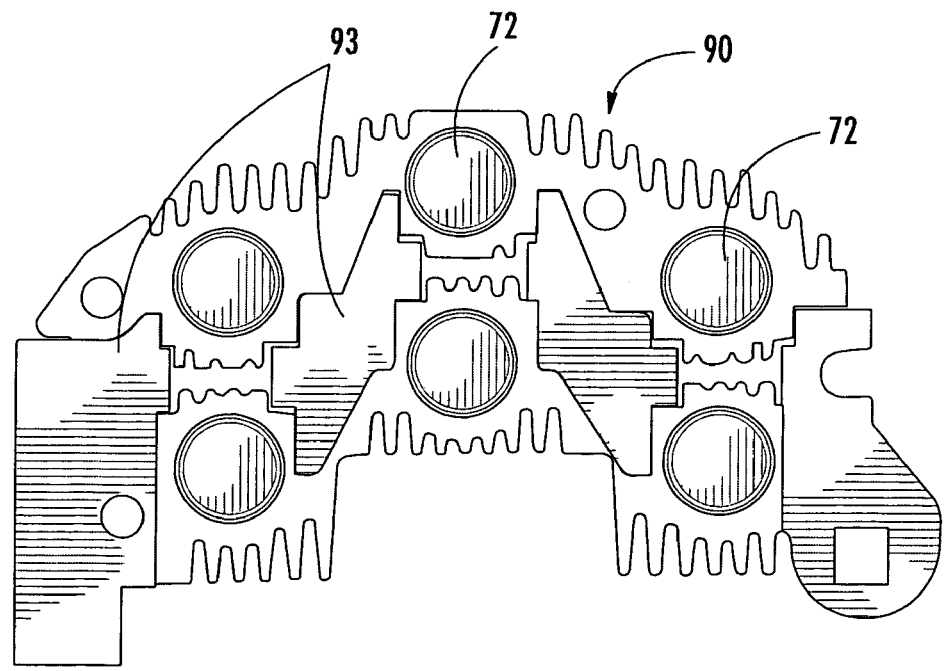
FIG. 7 is a bottom plan view of the proposed bridge rectifier shown in FIG. 6.

FIGS. 6 and 7 show another proposed prior art bridge rectifier 90 similar to that shown in FIGS. 2 and 3 but without the stacked configuration of the heat sinks, but also using press fitted diodes 72. The straight line, i.e., vertical configuration of respective corresponding pairs of positive and negative press fitted diodes is not advantageous because little room is left to form long cooling fins, which are so necessary for cooling and heat sink capability in the CS-144 alternators. The bottom plan view in FIG. 7 shows the press fitted diodes 72 and a number of different terminal members 93 positioned at the bottom and having spacers and center terminals 94 extending upward for engaging the diodes.

Figure 8:
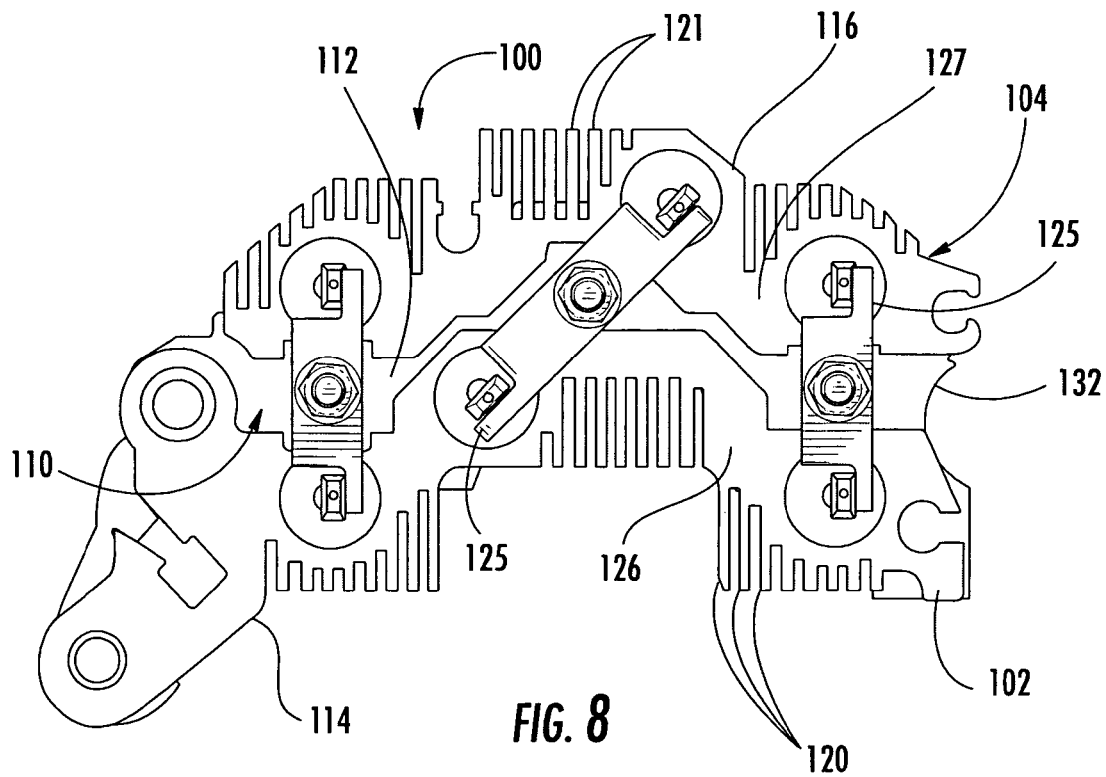
FIG. 8 is a top plan view of bridge rectifier of the present invention using adjacent heat sinks and showing press fitted diodes interconnected by a terminal assembly, where at least one set of diodes are positioned offset from each other at an angle to provide a maximum surface area for the cooling fins.
Figure 9:
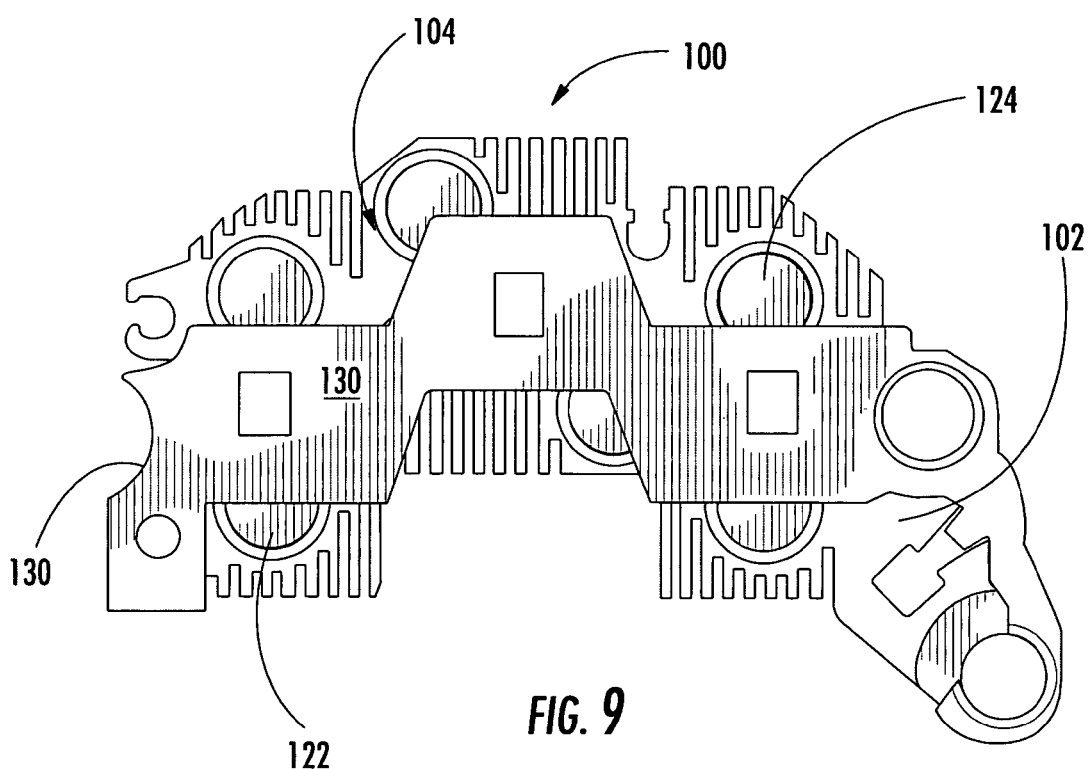
FIG. 9 is a bottom plan view of the bridge rectifier shown in FIG. 8.
Figure 10:
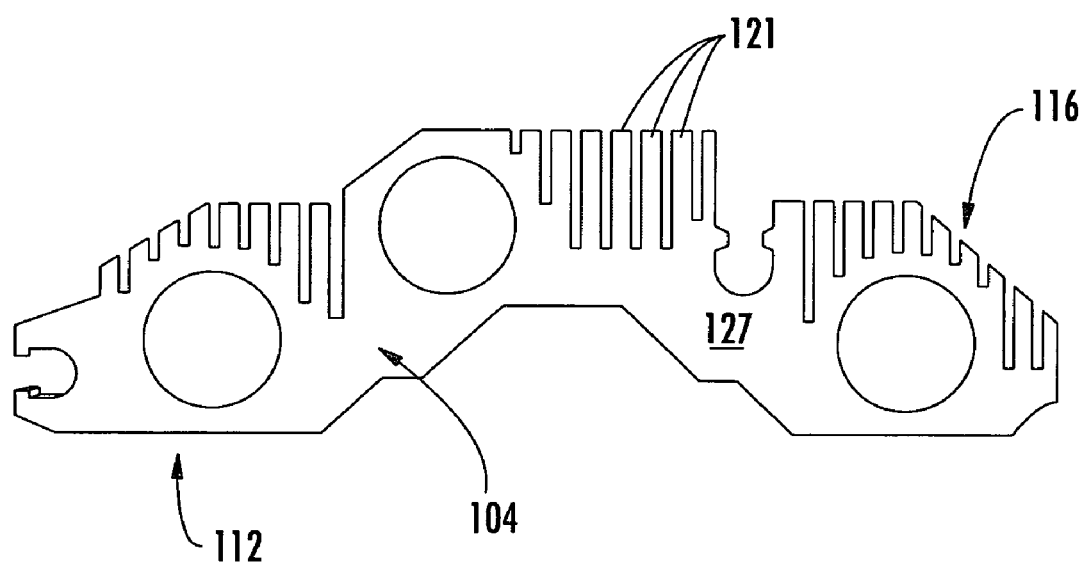
FIG. 10 is a top plan view of the negative heat sink of the present invention.
Figure 11:
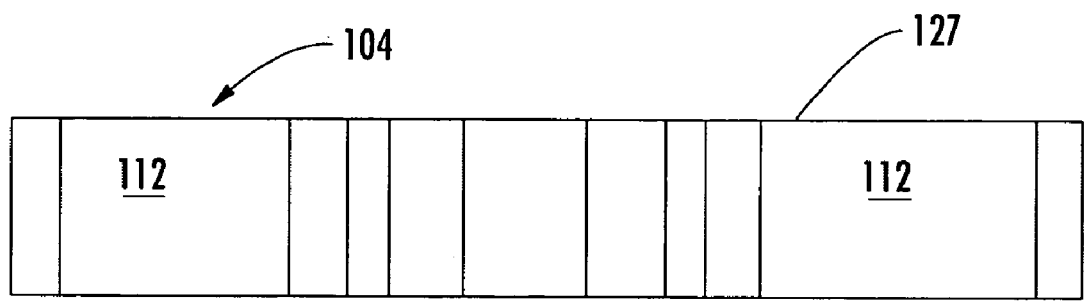
FIG. 11 is a front elevation view of the negative heat sink shown in FIG. 10.
Figure 12:
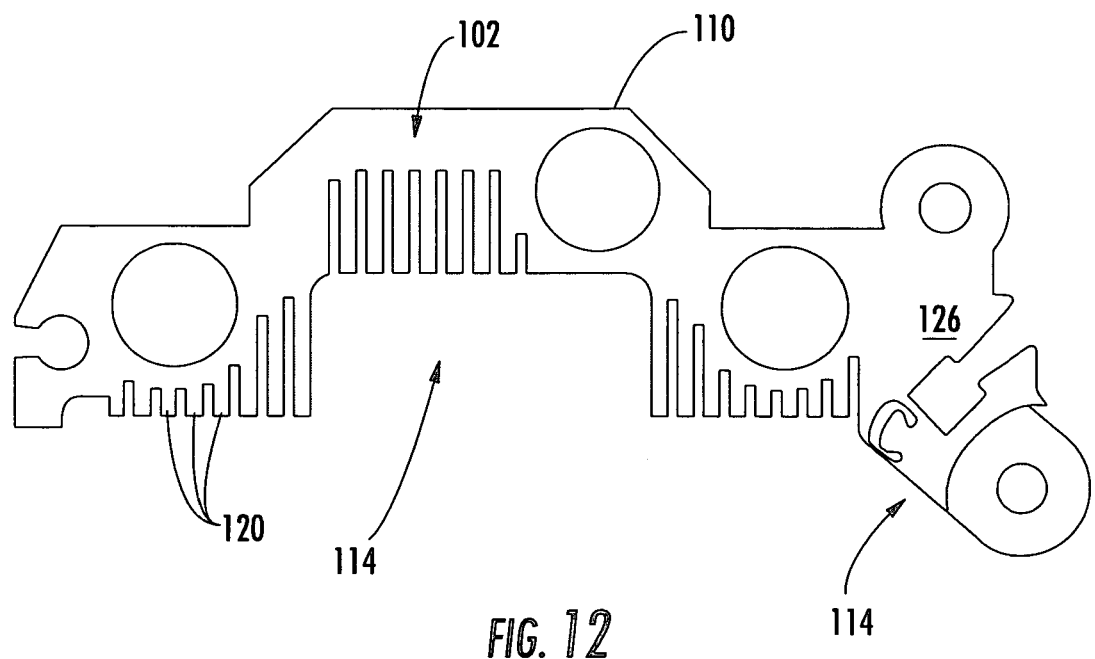
FIG. 12 is a top plan view of the positive heat sink of the present invention.
Figure 13:
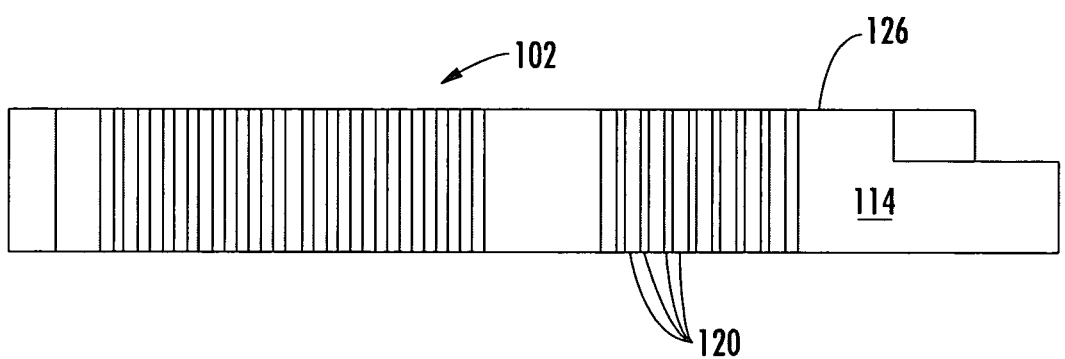
FIG. 13 is a front elevation view of the positive heat sink shown in FIG. 12.
Figure 14:
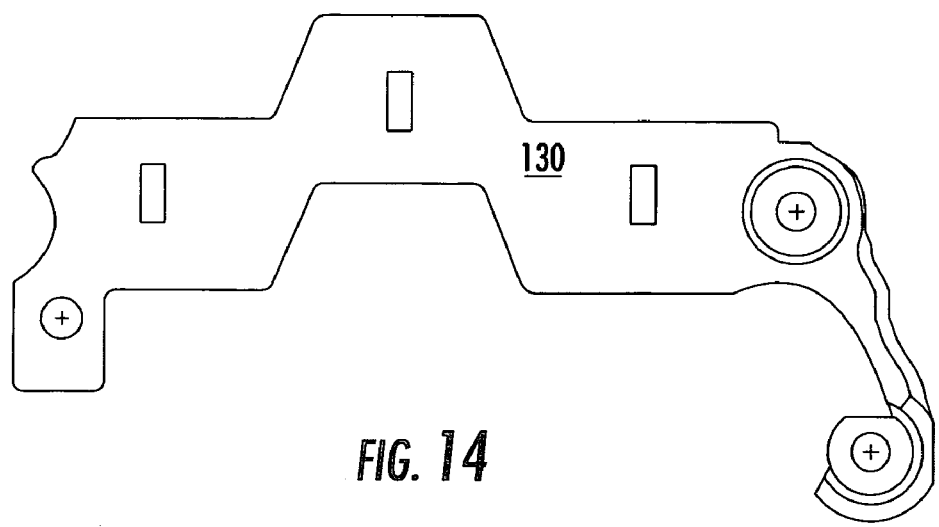
FIG. 14 is a top plan view of the lead frame that is positioned against the bottom of the positive and negative heat sinks.
Figure 15:
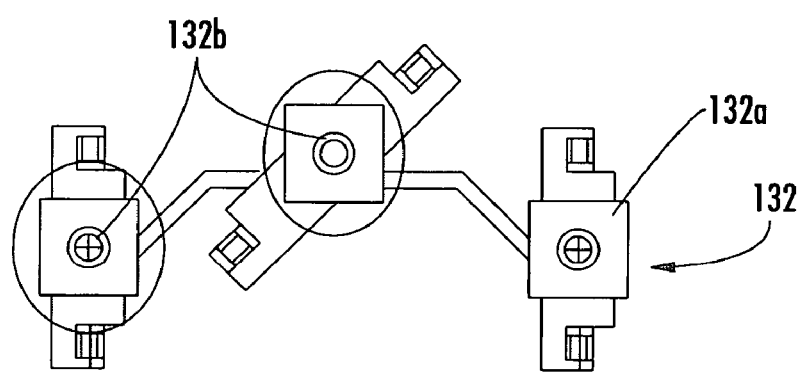
FIG. 15 is a top plan view of the terminal assembly that interconnects diode leads.
Figure 16:
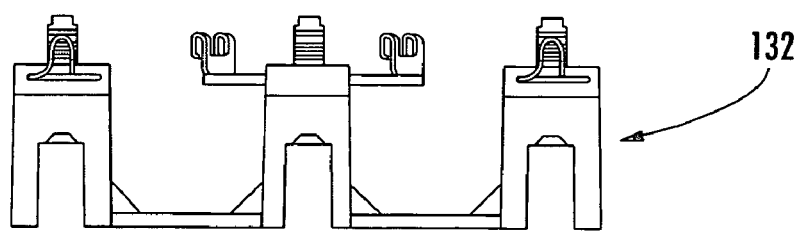
FIG. 16 is a front elevation view of the terminal assembly of the present invention.
Figure 17:
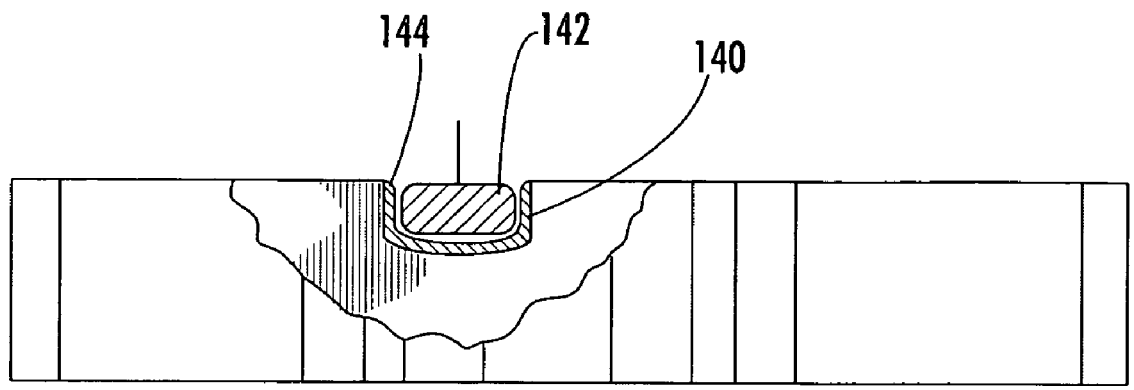
FIG. 17 is a front elevation view in partial section showing plated depressions formed in a heat sink and a diode received therein.
Figure 18:
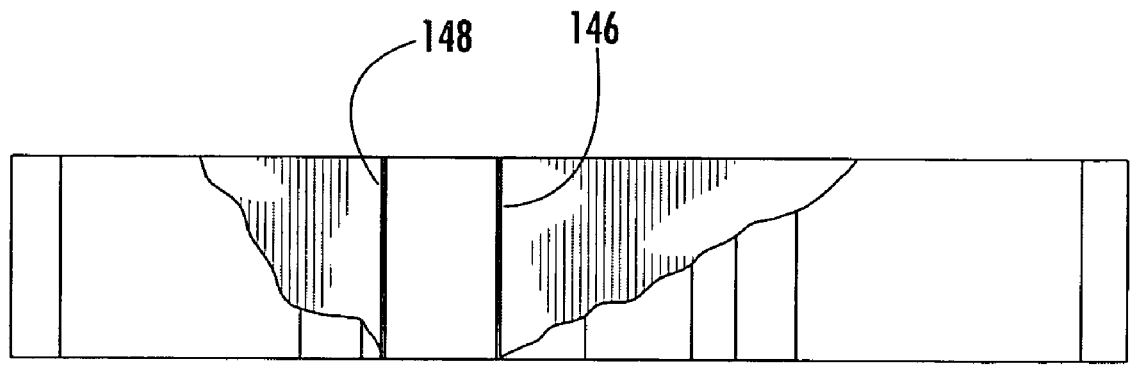
FIG. 18 is a front elevation view in partial section showing a metallic slug received with a heat sink that receives a diode within the slug.

FIGS. 8 and 9 show respective top plan and bottom plan views of the bridge rectifier 100 of the present invention. Positive and negative heat sinks 102,104 are spaced to form a gap 106. The heat sinks are configured to each include a side 110,112 facing each other and a cooling side 114,116, each having cooling fins 120,121 formed such as by saw cuts. Pressed fit diodes 122,124 are pressed into bores 125 the top surface 126,127 of each heat sink. A bottom lead frame 130 also shown in detail in the plan view of FIG. 14, and top terminal assembly 132, shown in detail in FIGS. 15 and 16, interconnect respective pairs of positive and negative diodes 122,124. FIGS. 8 and 9 clearly show that the respective positive and negative diodes 122,124 are interconnected by the terminal assembly 132 and one pair in the center is positioned offset from each other at an angle to provide a maximum surface area for the cooling fins 120,121 as compared to the proposed prior art bridge rectifier shown in FIGS. 6 and 7. Although press fitted diodes are illustrated, it is also possible to form depressions 140 (FIG. 7) that receive diodes 142 similar to button diodes. The depressions 140 can be plated with an appropriate conductive material 144 to aid heat and electrical conduction. It is also possible to use metallic slugs 146 (FIG. 18) that are received within bores 148 of positive and negative heat sinks. Each positive or negative diode is received within the metallic slug 146. The slugs can aid heat and electrical conduction.

The positive and negative heat sinks 102,104 are preferably formed from an extruded metal such as aluminum and the cooling fins 120,121 could be formed by cutting with a saw blade or formed by other means. In one aspect of the present invention, the lead frame 130 and terminal assembly 132 are formed from an insulator material, such as vinyl. When the bridge rectifier shown in FIGS. 8 and 9 of the present invention is positioned within an alternator body, the air vents and bridge rectifier 100 are positioned to allow maximum air flow through the cooling fins 120,121.

The lead frame 130 shown in FIG. 9 is positioned on a side of the positive and negative heat sinks opposite the terminal assembly as illustrated. This lead frame is formed as an integral one-piece unit as compared to the individual terminal members 93 shown in the proposed design of FIG. 7. Center portions of the lead frames include contacts for engaging the terminal assembly. The sides of the positive and negative heat sinks facing each other are configured to receive therebetween fastener members 132a as part of the terminal assembly and connecting the lead frame 130 and terminal assembly 132 together. Terminals 132b can be formed by bolts that receive a nut for fastening wires thereto. The terminal assembly is preferably formed from an insulator material, such as vinyl or other plastic, and includes embedded metallic terminals and contacts for the rectifier.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A charging system alternator comprising:
   an alternator body;
   a rotor coil mounted for rotation within the alternator body;
   stator windings supported in a housing for producing an electrical output as the rotor coil is rotated; and
   a bridge rectifier positioned within the alternator body and having an input connected to the stator windings for receiving and rectifying the electrical output from the stator windings, said rectifier comprising,
      a positive heat sink and a negative heat sink each having a top surface and spaced from each other and forming a gap therebetween, each heat sink including a side configured to face each other, and an opposing side, each side having slots formed therein extending from the opposing side to the side configured to face the other heat sink and forming oppositely positioned cooling fins;
      a plurality of respective pairs of negative and positive diodes positioned at each top surface of respective positive and negative heat sinks wherein said plurality at each top surface has a centrally located diode forming a pair of central diodes which is paired offset at an angle to other pairs of diodes; and
      a terminal assembly interconnecting respective pairs of negative and positive diodes, wherein said pair of central diodes positioned offset from each other at an angle provide a greater depth of slot and greater surface area for the cooling fins.

2. A charging system according to claim 1, wherein said diodes comprise press fitted diodes.

3. A charging system according to claim 1, and further comprising depressions formed within said positive and negative heat sinks in which said diodes are received.

4. A charging system according to claim 3, wherein said depressions are plated.

5. A charging system alternator according to claim 1, and further comprising metallic slugs received within said positive and negative heats sinks that each receive a respective positive or negative diode.

6. A charging system alternator according to claim 1, wherein said positive and negative heat sinks are formed from an extruded metal.

7. A charging system according to claim 6, wherein said extruded metal comprises aluminum.

8. A charging system alternator according to claim 1, wherein said positive and negative heat sinks are formed from aluminum.

9. A charging system alternator according to claim 1, wherein said terminal assembly is formed from an insulator material.

10. A charging system alternator according to claim 1, wherein said alternator body includes a rear cover having air vents, wherein said air vents and rectifier are positioned to allow maximum air flow through the cooling fins.

11. A charging system alternator according to claim 1, wherein said diodes include terminals and said terminal assembly engages terminals of respective positive and negative diodes.

12. A charging system alternator according to claim 1, and further comprising a lead frame positioned on a side of said positive and negative heat sinks opposite the terminal assembly.

13. A charging system alternator according to claim 12, wherein the sides of said positive and negative heat sinks configured to face each other form a gap, and further including fasteners received in the gap and connecting said terminal assembly and lead frame together.

14. A charging system alternator comprising:
    an alternator body;
    a rotor coil mounted for rotation within the alternator body;
    stator windings supported in the housing for producing an electrical output as the rotor coil is rotated; and
    a bridge rectifier positioned within the alternator body and having an input connected to the stator windings for receiving and rectifying the electrical output from the stator windings, said rectifier comprising,
       a positive heat sink and a negative heat sink each having a top surface and spaced from each other and forming a gap therebetween, each heat sink including a side configured to face each other, and an opposing side, each side having slots formed therein extending from the opposing side to the side configured to face the other heat sink and forming oppositely positioned cooling fins;
       a plurality of respective pairs of negative and positive diodes press fitted within the top surface of each respective positive and negative heat sink wherein said plurality at each top surface has a centrally located diode forming a pair of central diodes which is paired offset at an angle to other pairs of diodes; and
       a terminal assembly interconnecting respective pairs of negative and positive diodes, wherein said pair of central diodes positioned offset from each other at an angle provide a greater depth of slot and greater surface area for the cooling fins.

15. A charging system alternator according to claim 14, wherein said positive and negative heat sinks are formed from an extruded metal.

16. A charging system according to claim 15, wherein said extruded metal comprises aluminum.

17. A charging system alternator according to claim 16, wherein said diodes include terminals and said terminal assembly interconnects terminals of respective positive and negative diodes.

18. A charging system alternator according to claim 14, wherein said positive and negative heat sinks are formed from aluminum.

19. A charging system alternator according to claim 14, and further comprising metallic slugs received within said positive and negative heats sinks that each receive a respective press fitted positive or negative diode.

20. A charging system alternator according to claim 14, wherein said terminal assembly is formed from an insulator material.

21. A charging system alternator according to claim 14, wherein said alternator body includes a rear cover having air vents, wherein said air vents, and rectifier are positioned to allow maximum air flow though the cooling fins.

22. A charging system alternator according to claim 14, and further comprising a lead frame positioned on a side of said positive and negative heat sinks opposite the terminal assembly.

23. A charging system alternator according to claim 22, wherein the sides of said positive and negative heat sinks configured to face each other form a gap and further including fasteners received in the gap and connecting said terminal assembly and lead frame together.

24. A bridge rectifier adapted to be positioned within an alternator body and having input adapted to be connected to stator windings positioned within the alternator body for receiving and rectifying the electrical output from the stator windings, said rectifier comprising,
- a positive heat sink and a negative heat sink each having a top surface and spaced from each other and forming a gap therebetween, each heat sink including a side configured to face each other, and an opposing side, each side having slots formed therein extending from the opposing side to the side configured to face the other heat sink and forming oppositely positioned cooling fins;
- a plurality of respective pairs of negative and positive diodes positioned at each top surface of respective positive and negative heat sinks, wherein the plurality at each top surface has a centrally located diode forming a pair of central diodes which is paired offset at an angle to other pairs of diodes;
- a terminal assembly interconnecting respective pairs of negative and positive diodes, wherein said pair of central diodes positioned offset from each other at an angle provide a greater depth of slot and greater surface area for the cooling fins.

25. A bridge rectifier according to claim 24, wherein said diodes comprise press fitted diodes.

26. A bridge rectifier according to claim 24, and further comprising depressions formed within said positive and negative heat sinks in which said diodes are received.

27. A bridge rectifier according to claim 26, wherein said depressions are plated.

28. A bridge rectifier according to claim 24, and further comprising metallic slugs received within said positive and negative heats sinks that each receive a respective positive or negative diode.

29. A bridge rectifier according to claim 24, wherein said positive and negative heat sinks are formed from an extruded metal.

30. A bridge rectifier to claim 29, wherein said extruded metal comprises aluminum.

31. A bridge rectifier according to claim 24, wherein said positive and negative heat sinks are formed from aluminum.

32. A bridge rectifier according to claim 24, wherein said terminal assembly is formed from an insulated material.

33. A bridge rectifier according to claim 24, wherein said diodes include a terminals and said terminal assembly engages terminals of respective positive and negative diodes.

34. A bridge rectifier according to claim 24, and further comprising a lead frame positioned on a side of said positive and negative heat sinks opposite the terminal assembly.

35. A bridge rectifier according to claim 34, wherein the sides of said positive and negative heat sinks configured to face each other form a gap, and further including fasteners connecting said terminal assembly and lead frame together.

\* \* \* \* \*

UNITED STATES PATENT AND TRADEMARK OFFICE
CERTIFICATE OF CORRECTION

PATENT NO. : 7,116,021 B2
APPLICATION NO. : 10/737539
DATED : October 3, 2006
INVENTOR(S) : Fischer et al.

It is certified that error appears in the above-identified patent and that said Letters Patent is hereby corrected as shown below:

Column 9, Line 2   Delete:
   "allow maximum air flow though the cooling fins."

Substitute:
   -- allow maximum air flow through the cooling fins.--

Signed and Sealed this

Nineteenth Day of December, 2006

JON W. DUDAS
*Director of the United States Patent and Trademark Office*